May 8, 1962 A. R. WELLS ETAL 3,033,958
MOTOR PROTECTOR OR THE LIKE
Filed July 29, 1958
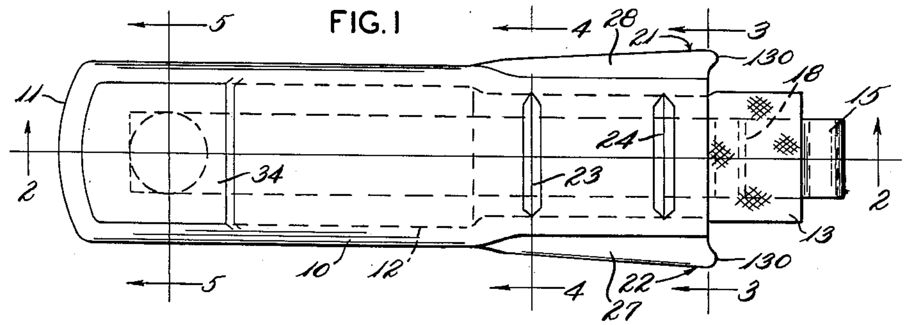
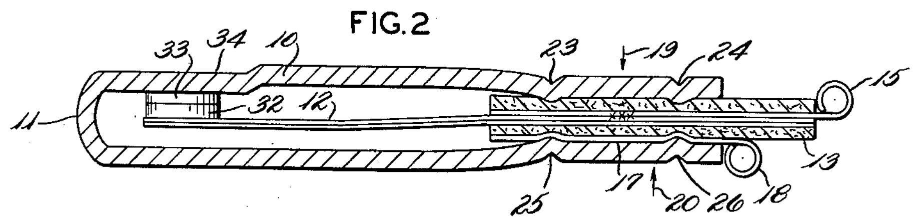
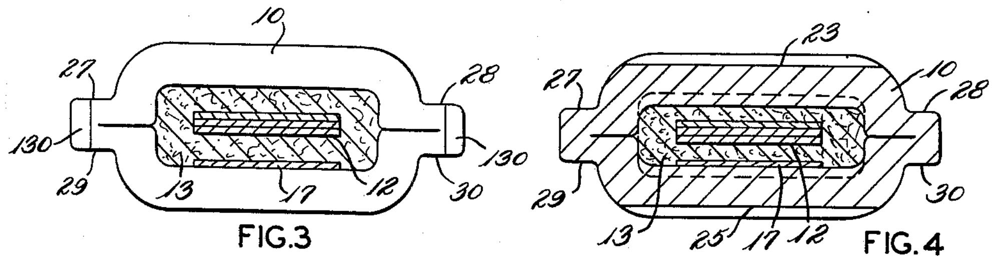
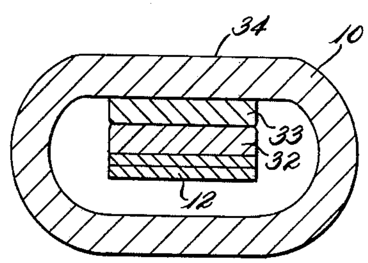
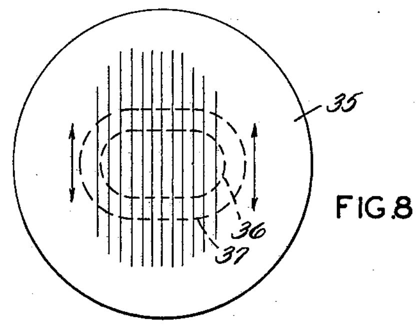
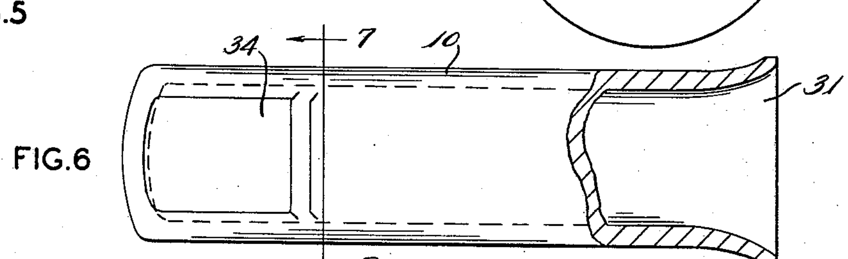
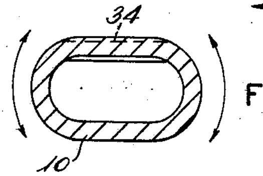
INVENTORS
ALTON R. WELLS
RUSSELL L. SCHWING
BY Olsen & Olson
ATTYS.

3,033,958
Patented May 8, 1962

3,033,958

MOTOR PROTECTOR OR THE LIKE

Alton R. Wells, 235 Edgerton Road, and Russell L. Schwing, 2191 Brentwood Drive, both of Akron, Ohio Filed July 29, 1958, Ser. No. 751,705
10 Claims. (Cl. 200—113)

This invention relates to motor protectors such as are used to control electric circuits and/or to protect motors or other electrically powered appliances from overload, or overheating. Motor protectors of the invention are particularly useful with fractional horsepower motors in the motor winding circuits thereof.

Heretofore many motor protectors, and similar articles, have been made where a metal casing or tubing is provided with a bi-metal strip positioned to extend thereinto as a cantilever member and which cantilever member has a contact button thereon for contact with a similar contact on the inner surface of the tube or casing wall. This bi-metal strip is insulated from the casing by any suitable insulation means and can be supported by flattening and staking one end of the bi-metal strip to the metal tubing as described in U.S. Patents Nos. 2,497,397 and 2,586,309. The opposite end of the metal tubing has normally been closed by a crimping or flattening action at a portion thereof far enough beyond the free or cantilever end of the bi-metal strip as to provide clearance for the strip for operative action thereon. The crimped or flattened end of the tubing has been sealed by solder, or other conventional means so as to provide a closed case end. The other end is closed by suitable heating, or baking of the insulation means received therein which action sets the insulation means in sealing engagement with the bi-metal strips and other means extending therethrough into the casing.

In thermostats and/or motor controllers as used today, these articles frequently are very small in size and the rapidity of action or response to the motor controller, or thermostat, in controlling operating characteristics in electrical circuits is dependent upon the thermal inertia and/or heat storing capacity of the thermostat casing and any excess metal present in the thermostat case slows down operation of the thermostat. In prior types of thermostats and/or motor controllers, as referred to, it has been necessary to provide a relatively great amount of material in the casing at the closed end thereof to which no leads extend inasmuch as the casing obviously must extend an appreciable distance beyond the cantilever section of the bi-metal control strip in the thermostat to insure proper operative clearances therefor.

The contact buttons used in many types of motor protectors used heretofore, when secured to the casing or wall of the casing, are positioned in and extend through holes in the casing by being riveted, or spun over on their outer ends to hold the contact button positioned in the hole in the casing. The contact button is sealed in the hole in the casing wall by solder, but solder and/or flux may enter the casing and contaminate the contacts therein.

Heretofore it has been proposed to close the end of the thermostat case adjacent the contact by a cap which closely fits over the end of the case and is united therewith by soldering. This construction provides a shorter thermostat than has been made before and normally provides proper clearance for the movable bi-metal strip but the provision of the cap is an addition of heat storing material to the motor protector casing, and a joint is provided in the motor protector at which leakage may occur at some time in operation. These motor protectors have, in some instances, been difficult to seal securely and permanently both at the contact receiving area of the casing and at the capped end of the casing, as oil or liquid insulating varnish may penetrate into the protector as the motor protector may be immersed in such materials when in use. Obviously, as the thermostat is employed as a safety device, any failure of the motor protector can readily result in damage to or loss of the apparatus with which the motor controller is associated.

Any leakage at a staked end of a motor protector casing supporting the bi-metal strip obviously likewise may cause failure of the thermostat after installation, but leakage of insulating varnish or other material into the casing from such staked end of the casing can be avoided more readily in practice by use of external seal means in association with the motor protector when in operative engagement with the motor winding or other similar appliance.

One further complication involved in prior types of motor protectors is that the motor protector case has a different coefficient of expansion and has different electrical resistance characteristics than the contact means therein. The contact member, for example, may be formed from silver or similar material, and is received, for example, in a copper case and is sealed therein by solder. As the operating temperature conditions may fluctuate frequently and widely in the area surrounding such motor protector, obviously the coefficients of expansion cause different movements of the contact button and the casing so that a leak may readily develop in the initially sealed contact area of the casing.

Motor protectors have quite severe specifications set up for them in use. For example, the protector may only be permitted two make and break cycles per minute when carrying relatively high currents, such as 18 to 50 amperes, and to maintain such circuit control action for several days. Hence, the electrical contact between the conductive casing and the contact secured thereto must be very good or the electric resistance will provide such a quantity of heat as to interfere with proper action of the protector in the motor winding circuit. Motor protectors of the invention have been made that are less than one inch long and that have .20 in. thickness so that small changes in their size and construction can produce appreciable change in their operating characteristics.

The present invention aims, as a general object, to overcome the foregoing and other difficulties in motor protectors and to provide a novel and improved motor protector.

Another object of the invention is to provide a motor protector where a drawn casing is used to house the operative elements of the motor protector and where one end of the casing is permanently closed and requires no seal means in association therewith.

A further object of the invention is to provide a motor protector or similar article where the provision of any aperture in the casing for receiving a contact member is avoided and the casing of the motor protector is particularly resistant to leakage of any material therethrough.

Another object of the invention is to provide a contact in a motor protector where the contact is welded to an unbroken inner wall of the casing of the motor protector to provide a permanent, minimum electrical resistance between such contact and the casing and to provide a maximum electrical bond for high amperage current flow therebetween.

Yet a further object of the invention is to provide a motor protector wherein only one possible leakage opening is provided therein in contrast with three such openings in prior constructions.

Objects of the invention are to provide a seamless drawn metal case having its open end swaged about the insulation and bi-metal strip at their supported position to provide a sealed chamber enclosing the contacts, to provide a special flat area in a drawn casing for receiving a contact, to eliminate the use of a side aperture in the casing for mounting the stationary contact, to provide a protector having a minimum amount of heat storing material in its case, to reduce or eliminate the soldering, and to provide a superior product.

These and other objects will appear from the following description and the accompanying drawings.

Of the drawings,

FIG. 1 is a plan view of a motor protector constructed in accordance with and embodying the principles of the invention.

FIG. 2 is a longitudinal sectional view taken on line 2—2 of FIG. 1, the bi-metal strip, the terminal strips and the contacts being shown in elevation.

FIG. 3 is a cross-sectional view thereof taken on line 3—3 of FIG. 1.

FIG. 4 is a cross-sectional view thereof taken on line 4—4 of FIG. 1.

FIG. 5 is a cross-sectional view thereof taken on line 5—5 of FIG. 1.

FIG. 6 is a side view of the seamless drawn case before its assembly with the other elements.

FIG. 7 is a cross-sectional view thereof taken on line 7—7 of FIG. 6.

FIG. 8 is a plan view of a metal blank from which the seamless case is drawn, the oval dot and dash line showing the orientation of the casing relative to the blank and the parallel double-headed arrows indicating the direction of the grain of the blank.

Referring to the drawings, the numeral 10 designates a seamless deep drawn case of electrical and heat-conductive ductile metal, such as copper alloy, having a closed end 11. The deep and narrow cup-shaped case is very highly cold-worked in the deep drawing operation and its strength thereby improved so that it has been found that the wall thickness of the case can be reduced by as much as one-third over the wall thickness necessary in a conventional tubular case. For example, in one size the protector, or thermostat of the present invention has a .020" wall thickness as compared to a .030" thickness in a sleeve type case. By thus cutting down the mass of the protector it responds more quickly to temperature changes. A strip 12 of bimetal extends into the case from its open end and is insulated from the case by a tubular sleeve 13 of silicone compound impregnated braided fiberglass. The bi-metal strip itself is formed at its end outside the case into a wire receiving eye 15. A contact strip 17 extends between the sleeve 13 and the wall of the case 10 in contact with the case and is formed with a wire receiving eye 18 beyond the case.

For sealing the open end of the case and clamping the assembled bi-metal strip, sleeve and contact strip within the mouth of the case, the mouth of the case is flattened by pressure applied in opposed directions 19 and 20 while confining the mouth of the case at positions 21 and 22 and at the same time cross-staking the case at 23, 24, 25 and 26 and axial staking 27, 28, 29 and 30. The case before flattening and staking is shown in FIGS. 6 and 7 and it will be noted that it is of oval cross-section and has a bell mouth 31 which assists in entering the parts in the case and provides additional material to be swaged or molecularly displaced from the bell mouth position to the inwardly swaged position about the inserted parts. In effect, the compacting of the bell mouth to the inwardly swaged position has been found to more fully and completely crowd in material around the sleeve and bi-metal to more fully close the corners and more fully seal the case. This seal is so tight that when the motor protector is heated to high temperatures of even up to about 350° F., for example, no appreciable air is driven out of the inside of the case and air pressure is maintained within the case. Thus, when the hot protector is dipped into cold varnish, no varnish is drawn into the inside of the case. As distinct from the operation of the sealed protector of the present invention, in prior art articles when a protector is heated, for example to 125° F., air starts to escape from the case and no internal pressure or vacuum can be maintained. Then when the motor protector cools, a partial vacuum is started to be created inside the case which draws in contaminating varnish, oil, or the like to the detriment of the operation and life of the motor protector. The flattening or swaging and staking may all be done in a single operation by a die adapted to confine the material at positions 21 and 22 while applying confining pressure at 19, 20. It should be noted here that the drawing of the case does two principal things. First, it cold works the metal and gives added strength so that the seal is better maintained. Second, it allows the wall thickness of the case to be reduced which means less mass or weight of metal making the protector more quickly responsive to temperature changes.

When swaging or flattening the metal in the case 10 and forming the axial staking 27 through 30, the metal is shaped so that such staking flares outwardly towards the open end of the case, as shown in FIG. 1 so that the case has its maximum width at its open end at the axially extending staking 27 through 30. Furthermore, the metal is so worked and/or shaped that tips 130 are formed on the axial staking and they extend axially slightly from the remainder of the open end of the case. Such shape of the axial staking aids in obtaining improved seal action at the open end of the case 10.

The bi-metal strip 12 has a contact button 32 of silver or other suitable metal mounted on its cantilever end for contact with another contact button 33 of similar material mounted on the wall of the case 10. These buttons are preferably welded to their supports. The case 10 has an unbroken depressed flat area 34 at the closed end thereof, the case being of reduced height at such depression to facilitate mounting the contact button 33 and welding it to the wall of the case at the proper position to align with the contact 32.

While the case 10 may be of any ductile metal, it is preferred to employ copper for this purpose. Also, it has been found that the direction of the grain of the metal, or direction of greatest elongation of the molecules due to rolling or drawing the metal in flat shape, relative to the cross-sectional axes of the case is important. In FIG. 8, a round blank 35 of metal has the direction of its grain indicated by double-headed arrows. The chain-dotted lines 36, 37 indicate the inner face and outer face of a case of the desired cross-section to be drawn from the blank. By orienting the blank as shown with its grain normal to the major cross-sectional axis of the case, the grain will be in the direction indicated by the arrows in FIG. 7 in the drawn case or extending circumferentially of the case at its most sharply rounded sides, the grain of the material at the flat sides being axially of the case. This orientation of the grain of the material provides the greatest resistance to splitting of the mouth of the case during the flattening and swaging operation. As the contact button 33 is welded to the inside of the unbroken wall of the seamless case 10, avoiding the use of solder or fluxes, and the throat of the case is swaged about the elements extending therethrough in a manner to seal the case against entrance of solvents or contaminating gases or liquids, reliable working of the motor protector is assured and the chance of the contacts being tarnished or gummed in use after a short service life is eliminated.

By the improved seal obtained in the case 10, inert gas may be introduced into and be retained therein to provide improved service life in the sealed protector.

Thus it will be seen that the objects of the invention have been attained.

It has been found that thermostats and motor protectors made in accordance with this invention have had improved heat transfer action to and from the motor controller casing. The motor controller has had as much as 25 to 50 percent greater service life than prior types of articles.

While a certain representative embodiment and details have been shown for the purpose of illustrating the invention, it will be apparent to those skilled in the art that various changes and modifications may be made without departing from the scope of the invention as it is defined by the following claims.

What is claimed is:

1. An electric circuit protector comprising a deep-drawn seamless oval-shaped case of relatively thin-walled highly cold-worked ductile metal having a closed end and an open end opposite thereto, said case having the grain of its metal extending circumferentially at its most sharply rounded sides, a contact button welded to the unbroken inner face of said case near its closed end, a bi-metal strip extending into said case from its open end, a contact button mounted on the innermost end of said bi-metal strip for contacting the button on said case, a tubular sleeve of insulating material about said bi-metal strip adjacent the open end of said case, and the metal wall about said sleeve being swaged from an intermediate bell mouth position to an inwardly folded final compacted position closely about said sleeve to materially compress, cold work and compact the already cold-worked material of the case against the sleeve and the bi-metal strip and seal the space within the case.

2. A motor protector, or the like comprising a strip of bi-metal having a terminal at one end thereof for connecting it in a circuit and a contact button at the opposite end thereof, a tubular sleeve of insulating material about said strip adjacent its terminal, a seamless case of ductile metal of capsule-like shape mounted about said bi-metal strip and closely embracing said sleeve to support said bi-metal strip for operative action within said case and to seal the space thereabout, said case having a closed end and a flat section in its wall adjacent said closed end, said case having said flat section offset from adjacent portions of the case to provide a reduced height portion in the case to facilitate securing a contact to the inner surface of said flat section, and a contact button welded to the inner face of said case at said flat section in position to contact the button on said strip, said case at its position of engagement with said sleeve having the characteristics resulting from contraction of its walls about said sleeve.

3. A motor protector, or the like comprising a strip of bi-metal having a terminal at one end thereof for connecting it in a circuit and a contact button at the opposite end thereof, a tubular sleeve of insulating material about said strip adjacent its terminal, a seamless case of ductile metal of capsule-like shape mounted about said bi-metal strip and closely embracing said sleeve to support said bi-metal strip and to seal the space thereabout, said case being of oval cross-section with the grain of the metal circumferential of the cross-section at the more convex areas of its sides adjacent a mouth of the case and the material of the case about said mouth having the characteristics of material molecularly displaced from an intermediate outwardly flared condition of the case to a final inwardly swaged condition thereof holding said sleeve in compressed sealing relation, and a contact button conductively secured to the continuous unbroken inner face of said case in position to contact the button on said strip.

4. A motor protector, or the like having a deep-drawn, relatively thin-walled and highly cold-worked deep and narrow cup-shaped copper alloy case, said casing having a flat section adjacent the closed end thereof in a portion of said case of reduced height to facilitate engaging a contact thereto, a contact button welded to the inside of the bottom of the case at said flat section therein, strip means including a bi-metal heat-responsive member inside the case, a second contact button on the strip means and positioned to make and break with first button, an insulating sleeve around the strip means at the end of the case remote from the bottom, and the case being swaged down around the sleeve to compress it in sealing relation about the strip means and to hold the strip means in cantilever supported position extending into the case.

5. A motor protector as in claim 4 where axially extending staking is formed on flattened sides of said case extending to the open end thereof, said staking being shaped to flare outwardly at the open end of said case, said case being of maximum width at said staking at the open end of said case to provide effective seal action on members positioned in said open case end.

6. A protector as in claim 1 where said swaging provides axially extending staking at opposite sides of said case at the open end thereof, said staking including tips protruding axially beyond the remainder of said case to reenforce said staking.

7. A method of making a motor protector or the like and comprising the steps of deep-drawing a seamless metal case having an open end and a closed end, the grain of the metal in the case extending normal to the longitudinal axis of the case, the case having an outwardly flared open end, assembling the components of a motor protector including a bi-metal strip and insulation means within the case, at least a portion of the bi-metal strip and insulation means extending through the open end of the case, and cold working the flared open end of the case and metal adjacent thereto to compress it against the insulation means and tightly secure it around said bimetal strip and simultaneously form longitudinally extending flattened sections in opposed portions of the wall of the case at its open end to aid in compressing the case against the insulation means.

8. A motor protector, or the like comprising a generally cup-shaped metal casing having an open end and a permanently closed end, said casing having an unbroken portion therein of reduced external and internal height adjacent the closed end thereof to facilitate access to the inner surface of said portion, a contact button welded to the inside of the casing at said reduced height portion thereof, strip means including a bi-metal strip member of optionally resistivity for calculated time response to external heat and to internally generated heat inside the case, a second contact button on the strip means and positioned to make and break contact with the first button, and insulating means operatively associated with the strip means at the open end of the casing, said casing engaging the insulating member to compress it in sealing relation about the strip means and to hold the strip means in cantilever supported position extending into the casing.

9. A method of making a motor protector or the like and comprising the steps of deep-drawing a metal blank to produce a case having closed end and an outwardly flared open end, the grain of the metal in the case extending normal to the longitudinal axis of the case, assembling the components of a motor protector including a bi-metal strip and insulation means within the case, at least a portion of the bi-metal strip and insulation means extending to the open end of the case, cold working the flared open end of the case and metal adjacent thereto to compress it against the insulation means and tightly seal the insulation means around said bi-metal strip, and simultaneously forming longitudinally extending flattened sections in opposed portions of the wall of the case at its open end while restraining the case against lateral movement to permit only limited widening thereof to aid in compressing the case against the insulation means.

10. A method of making an electrical control such as a motor protector or the like and comprising the steps of deep-drawing a metal blank to produce a case having closed end and an open end, the grain of the metal in the case extending normal to the longitudinal axis of the case, assembling the components of an electrical control including a bi-metal strip and insulation means within the case, at least a portion of the bi-metal strip and insulation means extending to points adjacent the open end of the case, cold working the open end of the case and metal adjacent thereto to compress it against the insulation means and tightly seal the insulation means around said bi-metal strip, and simultaneously forming longitudinally extending flattened sections in a pair of opposed portions of the wall of the case adjacent its open end to compress the case against and around the insulation means to seal the previously open end of the case and to position the bi-metal strip.

References Cited in the file of this patent

UNITED STATES PATENTS

| | | |
|---|---|---|
| 1,608,900 | Mayer | Nov. 30, 1926 |
| 2,497,397 | Dales | Feb. 14, 1950 |
| 2,509,020 | Stauffer et al. | May 23, 1950 |
| 2,574,192 | Samuel | Nov. 6, 1951 |
| 2,586,309 | Dales | Feb. 19, 1952 |
| 2,820,870 | Moksu | Jan. 28, 1958 |
| 2,855,485 | Webking | Oct. 7, 1958 |
| 2,877,539 | Kinnan | Mar. 17, 1959 |
| 2,881,290 | Dales | Apr. 7, 1959 |

FOREIGN PATENTS

| | | |
|---|---|---|
| 66,628 | Norway | Aug. 16, 1943 |
| 428,874 | Great Britain | May 21, 1935 |